United States Patent
Teo et al.

(10) Patent No.: US 7,572,069 B2
(45) Date of Patent: Aug. 11, 2009

(54) SURFACE WARP RESISTANT OPTICAL DEVICES

(75) Inventors: Tat Ming Teo, Singapore (SG); Songyang Li, Singapore (SG)

(73) Assignee: Finisar Corporation, Sunnyvale, CA (US)

( * ) Notice: Subject to any disclaimer, the term of this patent is extended or adjusted under 35 U.S.C. 154(b) by 52 days.

(21) Appl. No.: 11/864,687

(22) Filed: Sep. 28, 2007

(65) Prior Publication Data

US 2009/0074357 A1    Mar. 19, 2009

Related U.S. Application Data

(60) Provisional application No. 60/973,070, filed on Sep. 17, 2007.

(51) Int. Cl.
*G02B 6/36* (2006.01)
(52) U.S. Cl. .............................. 385/93; 385/33; 385/36; 385/88; 385/92; 385/94
(58) Field of Classification Search ................... 385/33, 385/36, 88, 92–94
See application file for complete search history.

(56) References Cited

U.S. PATENT DOCUMENTS 6,459,835 B1 * 10/2002 Nagaoka et al. ................ 385/43
2006/0263015 A1 * 11/2006 Fincato et al. ................. 385/92

OTHER PUBLICATIONS

Tat Ming Teo, et al, Managing Backreflection, United States Patent Application, filed Sep. 28, 2007.
VS (VitroStub)-receptacle, TOTO: Precision Ceramics & Optical Components, 2 pgs, available at http://www.toto.co.jp/E_Cera/vitro_stub_receptacle.htm.

* cited by examiner

*Primary Examiner*—Frank G Font
*Assistant Examiner*—Michael P Mooney
(74) *Attorney, Agent, or Firm*—Workman Nydegger (57) ABSTRACT

In at least one example, an optical component includes a central optical surface proximate an optical axis, a peripheral portion extending radially from the central optical surface, and a stepped portion between the central optical surface and the peripheral portion. The stepped portion may be formed to raise the central optical surface above the peripheral portion.

20 Claims, 5 Drawing Sheets

SURFACE WARP RESISTANT OPTICAL DEVICES

RELATED APPLICATIONS

The present application claims priority to U.S. Provisional Application Ser. No. 60/973,070 filed Sep. 17, 2007, which is hereby incorporated by reference in its entirety.

BACKGROUND OF THE INVENTION

1. The Field of the Invention

The present invention relates to optical devices and to optical devices that include features for increasing the surface warp resistance of the optical devices.

2. Background

Fiber optic technology is increasingly employed in the transmission of data over communication networks. Networks employing fiber optic technology are known as optical communication networks, and are typically characterized by high bandwidth and reliable, high-speed data transmission.

To communicate over an optical communication network using fiber optic technology, fiber optic components such as fiber optic transceivers or transponders are used to send and receive optical signals. Generally, a fiber optic transceiver includes one or more optical sub-assemblies ("OSAs") having an optical transducer. For example, transmitter optical sub-assemblies ("TOSAs") have an electro-optical transducer for sending optical signals, and receiver optical sub-assemblies ("ROSAs") have an optoelectronic transducer for receiving optical signals. More particularly, a TOSA receives an electrical data signal and converts the electrical data signal into an optical data signal for transmission onto an optical network. A ROSA receives an optical data signal from the optical network and converts the received optical data signal to an electrical data signal for further use and/or processing. Both the ROSA and the TOSA include specific optical components for performing such functions.

For example, a typical TOSA includes an optical transmitter such as a light emitting diode or a laser diode for transmitting an optical signal to an optical fiber or optical waveguide. The optical transmitter is typically covered by an at least partially transparent cap that protects the optical transmitter while allowing the optical transmitter to transmit the optical signal to the optical cable. The cap may include a lens for focusing the optical signal transmission.

A typical ROSA includes an optical receiver, such as a PIN photodiode or avalanche photodiode ("APD"). The optical receiver is typically covered by an at least partially transparent cap that protects the optical receiver and allows the optical receiver to receive an optical signal from an optical cable. The cap may include a lens for focusing the optical signal transmission received from the optical cable.

The lens and other optical components are often press fit into the corresponding OSA. When an optical component is press fit to a holder, the compression force may alter the surface profile of the optical component. This may be especially significant if the optical component uses soft or deformable material, such as plastic. Further, while the OSA is operating the optical components may be subjected to large amounts of thermal energy. The thermal energy causes the optical component to expand relative to the holder, resulting in compressive forces on the optical component due to differences in the coefficients of thermal expansion (CTE) of the holder and the optical component, which may result in stress on the surfaces of the optical component. Stress on the surfaces of the optical component may result in a change in the reflective index and/or birefringence of the materials. Such changes may interfere with the efficient operation of the optical component by changing the focus spot size, the position of the image and/or the quality of the image.

Previous attempts to reduce stresses on the surfaces of optical components due to press fitting and/or thermal expansion have included the use of a holder and optical component with similar CTEs. Such approaches are often impractical as such material may have been difficult to obtain and/or the material selection may have been at least partially constrained by the product specifications. Other attempts have included using compliant adhesive materials to bond the optical component to the holder. Such approaches may be costly due, at least in part, to additional process steps and additional costs associated with obtaining and using the materials.

BRIEF SUMMARY OF THE INVENTION

In at least one example, an optical component includes a central optical surface proximate an optical axis, a peripheral portion extending radially from the central optical surface, and a stepped portion between the central optical surface and the peripheral portion. The stepped portion may be formed to raise the central optical surface above the peripheral portion.

In another example, an optical component includes an optical surface having an optical axis extending therethrough, a peripheral portion adjacent the optical surface, and a boundary portion adjacent the peripheral portion. In such an example, at least a portion of the peripheral portion defines a recess between the boundary portion and the optical surface.

In yet another example, optical sub-assembly includes an opto-mechanical holder and an optical component secured to the opto-mechanical holder. The optical component may include a central optical surface proximate an optical axis, a peripheral portion extending radially from the central optical surface, and a stepped portion between the central optical surface and the peripheral portion in which the stepped portion is formed to raise the central optical surface above the peripheral portion.

These and other features of the present invention will become more fully apparent from the following description and appended claims, or may be learned by the practice of the invention as set forth hereinafter.

BRIEF DESCRIPTION OF THE DRAWINGS

To further clarify certain aspects of the present invention, a more particular description of the invention will be rendered by reference to specific embodiments thereof which are disclosed in the appended drawings. It is appreciated that these drawings depict only example embodiments of the invention and are therefore not to be considered limiting of its scope. Aspects of the invention will be described and explained with additional specificity and detail through the use of the accompanying drawings in which.

DETAILED DESCRIPTION OF EXAMPLE EMBODIMENTS

Devices, systems, and methods are provided herein for reducing the stress on a surface of an optical component from compressive forces due to such factors as press fitting, thermal expansion and/or thermal contraction. In at least one example, an optical component includes at least one optical surface, a peripheral portion, and a boundary portion. The optical component has at least one stepped portion between the peripheral member and the optical surface that raises the optical surface relative to the peripheral portion to form a raised optical surface. Such a configuration may at least partially isolate the raised optical surface from stresses that act on other portions of the raised optical surface. The boundary portion may be raised relative to both the peripheral portion and the raised optical surface, such that a relief is formed between the raised optical surface and the boundary portion. Such a configuration may allow the boundary portion to provide both axial and radial protection to the raised optical surface.

Optical components with raised optical surfaces can be implemented in a variety of OSAs, including any of the OSAs that are integrated into optoelectronic transceiver and transponder modules. In addition, optical components with raised optical surfaces can be implemented in any OSA irrespective of the data rate, operating wavelength, transmission standard, case temperature range, connector type, module type, or reach of the OSA.

Figure 1A:
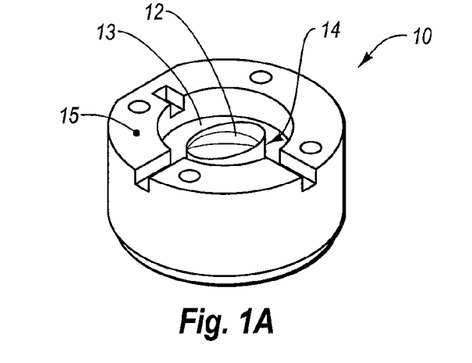
FIGS. 1A-1D illustrates an optical component according to one example.
Figure 1B:
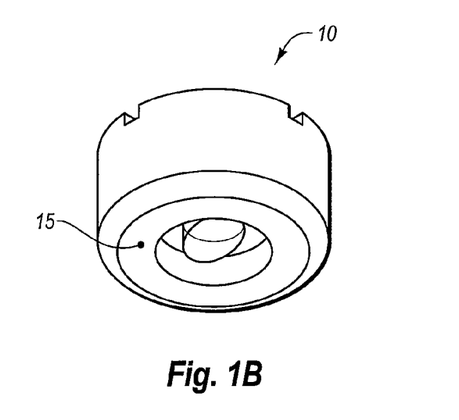
Figure 1C:
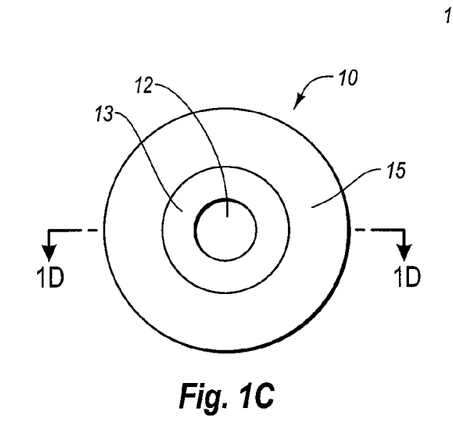
Figure 1D:
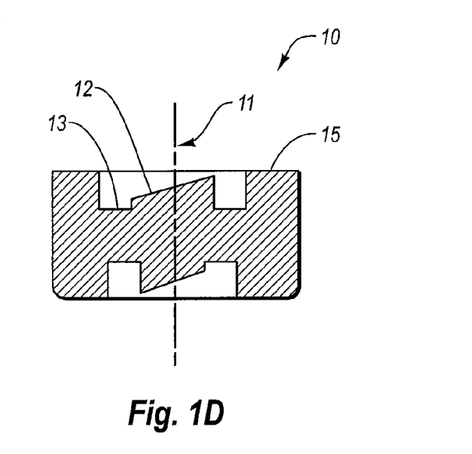

FIGS. 1A-1D illustrate an optical component 10. In particular, FIG. 1A illustrates a top perspective view, FIG. 1B illustrates a bottom perspective view, FIG. 1C illustrates a plan view, and FIG. 1D illustrates a cross-sectional view taken along section 1D-1D from FIG. 1C. For ease of reference, the optical component 10 will be described as a generally concentric optical component that is concentric about an axis 11, which may be aligned with an optical axis of an assembly of which the optical component is a part. Accordingly, an axial dimension may generally correspond to a depth dimension while the radial component may generally correspond to a width dimension. Further, for ease of reference one side of the optical component 10 will be described. This description may apply equally to the other side of the optical component 10. Further, while an angled optical surface is illustrated, optical components may include flat, spherical, and/or aspherical surfaces to form lenses, prisms, or other type of optical device.

As illustrated in FIG. 1D, the optical component 10 generally includes a raised optical surface 12 proximate a central portion, such as a raised lens surface or a raised prism surface. A peripheral portion 13 is illustrated as extending radially from the raised optical surface 12. In at least one example, the raised optical surface 12 may be raised and separated from the peripheral portion 13 by a stepped portion 14. Accordingly, the stepped portion 14 provides axial separation between the raised optical surface 12 and the peripheral portion 13.

In at least one example, the optical component 10 further includes a boundary portion 15. The boundary portion 15 may extend both laterally and axially from the peripheral portion 13. In particular, the boundary portion 15 may be sized to extend axially beyond the raised optical surface 12 resulting in a gap between the raised optical surface 12 and the boundary portion 15.

The extension of the boundary portion 15 beyond the raised optical surface 12 may allow the boundary portion 15 to protect the raised optical surface 12. The extension of the boundary portion 15 radially beyond the peripheral portion 13, as well as the configuration of the peripheral portion 13 and the stepped portion 14 may reduce the effects of thermal and/or mechanical stress on the performance of the optical component 10 by reducing stress in the raised optical surface 12. Such stresses may be due to compressive and/or thermal forces present when the optical component is operating while secured to an optical sub-assembly.

Figure 2:
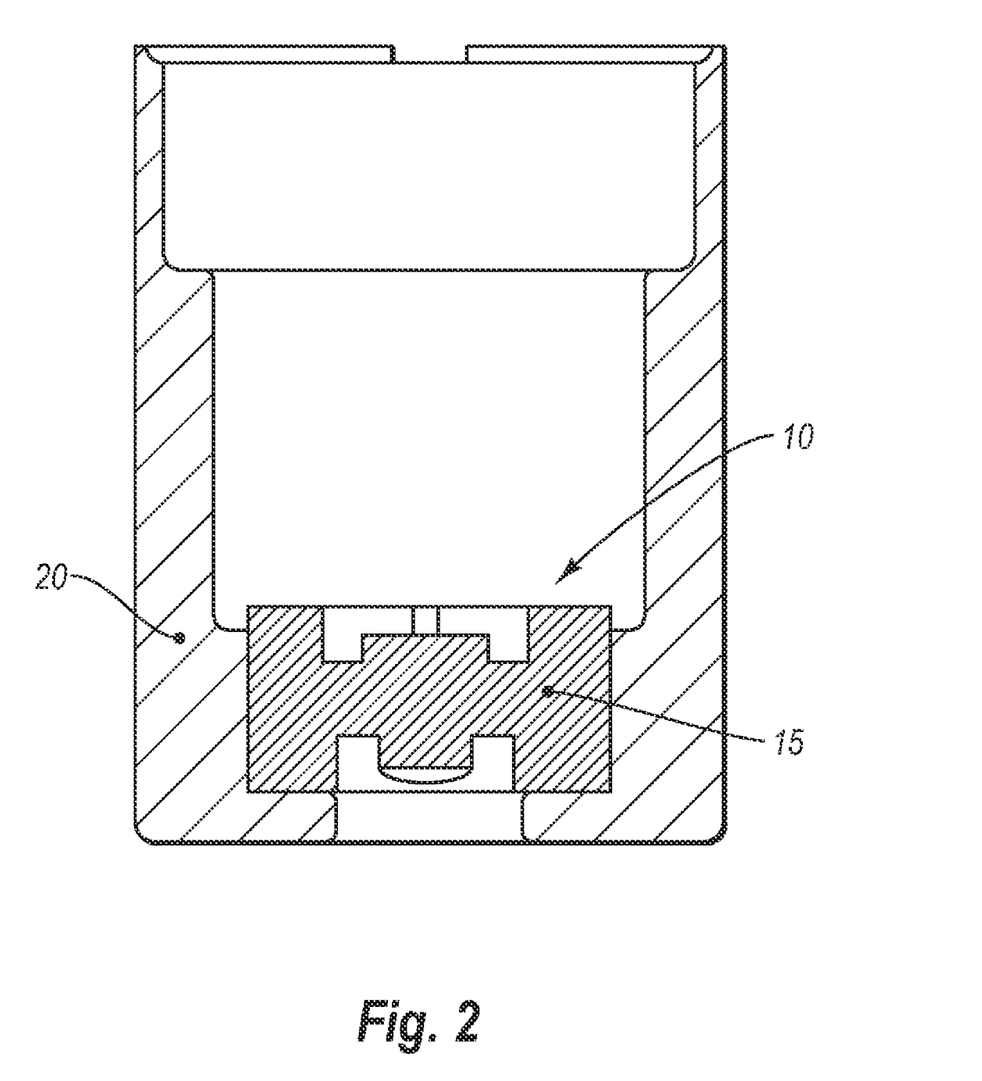
FIG. 2 illustrates an optical component fitted to an opto-mechanical holder.

FIG. 2 illustrates a cross-sectional view of the optical component 10 secured to an opto-mechanical holder 20. The optical component 10 may be press fit and/or bonded to the optical mechanical holder. Stresses in the optical component may be due, at least in part, to a difference in size between the optical mechanical holder 20 and the optical component 10. For example, mechanical stresses may occur in press fitting the optical component 10 to the opto-mechanical holder 20. In particular, a press fit may be realized when the outer dimension of the optical component 10 is slightly larger than the inner dimension of the opto-mechanical holder 20. The difference in dimension results in a compressive force that secures the optical device at a desired location and orientation relative to the opto-mechanical holder 20.

Thermal stress may occur when the optical component 10 and/or the opto-mechanical holder 20 are heated. In particular, when light passes through the optical component, some portion of the light may be absorbed by the optical component 10. As the light is absorbed, the optical component 10 heats up and expands. The opto-mechanical holder 20 may not absorb as much light and/or may be made of a material that expands less with a given temperature difference than the optical component. Other thermal conditions may cause the opto-mechanical holder to cool and/or contract more rapidly than the optical component 10. These and other differences may result in the opto-mechanical holder 20 being smaller than the optical component 10. The result may be additional compressive forces on the optical component 10, which results in stress in the optical component 10.

The configuration of the optical component 10 may reduce the effect such stress has on the raised optical surface 12. In particular, as the optical component 10 is compressed, such as by the opto-mechanical holder as described above, the stress may first compresses the boundary portion 15. The boundary portion 15 is separated from the raised optical surface 12 by a gap. As a result, stress is transferred from the boundary portion 15 to other parts of the optical component 10 is transferred to the peripheral portion 13.

The stresses that may be transferred from the peripheral portion 13 to the rest of the optical component may be influenced by the stepped portion 14. In particular, stress from the peripheral portion may be concentrated at or near the inner limits of the stepped portion 14. This may be due, in part, to the abrupt change of geometry of the part at the stepped portion 14. Regardless of the cause, the configuration of the optical component 10 reduces the stress that acts on the raised optical surface 12.

The configuration of the optical component helps reduce the stress on the optical surface as well as helping to achieve a more uniform surface deformation when subjected to temperature increases, temperature decreases, and/or compressive forces resulting from press fitting or other operations. Accordingly, the configuration of the optical component helps reduce the stress on the optical surface as well as helping to achieve a more uniform surface deformation, regardless of the source of the stress.

Figure 3A:
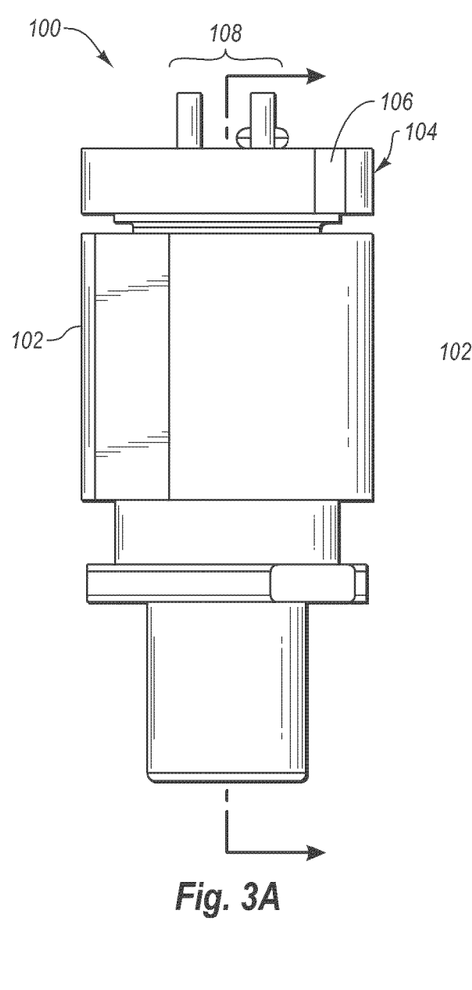
FIG. 3A discloses an example optical sub-assembly.
Figure 3B:
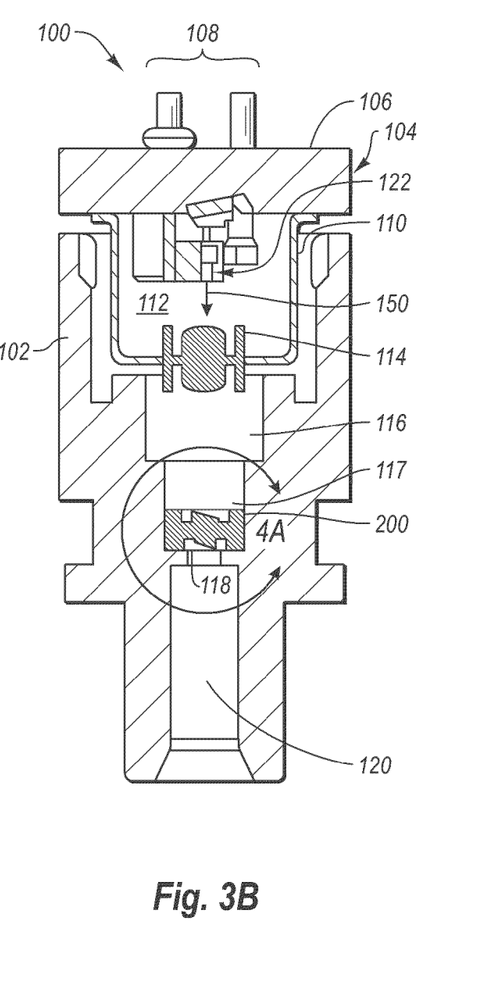
FIG. 3B discloses aspects of the optical sub-assembly of FIG. 3A.

FIGS. 3A and 3B disclose an example OSA 100. The OSA 100 is a transmitter optical sub-assembly (TOSA). The OSA 100 could be a receiver optical sub-assembly (ROSA) however, since example embodiments of the invention can be integrated into either a TOSA or a ROSA.

OSA 100 includes a barrel 102. The barrel 102 is connected to a TO-Can 104. As disclosed in FIG. 3B, the TO-Can 104 is partially disposed within the barrel 102. The TO-Can 104 includes a header 106 with multiple electrical leads 108 that are configured to electrically connect components of the TO-Can 104 with a printed circuit board and associated circuitry (not shown) of an optoelectronic transceiver or transponder module into which the OSA 100 is assembled. The leads 108 enable electrical power and electrical signals to be transmitted to and from the TO-Can 104. The TO-Can 104 also includes a cap 110 connected to the header 106. The cap 110 creates an air-tight evacuated enclosure 112 for various TO-Can components, as disclosed elsewhere herein.

The TO-Can 104 also optionally includes a lens 114 partially disposed in the cap 110. The lens 114 illustrated in FIGS. 3A and 3B includes a raised optical surface, a peripheral portion, and a boundary portion. A relief portion defined between the boundary portion and the raised optical surface. Although the illustrated lens 114 is a ball lens, lens 114 can be another type of lens including, but not limited to, a half-ball lens. Alternatively, the lens 114 can be removed where at least the corresponding portion of the cap 110 is light-transmissible, or the lens can be replaced with a window fitted in the cap 110.

The example OSA 100 includes a first cavity 116 in open communication with a second cavity 117, both of which are defined by the barrel 102. The first and second cavities 116 and 117 can be evacuated or can contain some kind of gas such as air. The OSA 100 also includes an optical device 200 for managing backreflection. The optical device 200 is discussed in greater detail below in connection with FIGS. 4A and 4B. In this embodiment the optical device 200 is disposed within the second cavity 117. The OSA 100 further includes a third cavity 118 defined by the barrel 102. The third cavity 118 is opposite the second cavity 117. Proximate the third cavity 118 is a port 120. The port 120 is defined in one end of the barrel 102. The port 120 is configured to receive an optical connector, such as a fiber ferrule, in order to facilitate the coupling of an optical fiber to the OSA 100. In another embodiment, the port 120 can be configured to receive an optical connector corresponding to an optical waveguide in order to facilitate the coupling of an optical waveguide to the OSA 100.

As noted earlier, the TO-Can may include various components. For example, the TO-Can 104 of the OSA 100 includes a transmitter 122 disposed within the evacuated enclosure 112. The transmitter 122 can be any type of transmitter. For example, the transmitter 122 can be a Fabry-Perot laser, DFB laser, or other edge emitter. The transmitter 122 can also be a VCSEL or LED. The transmitter 122 uses the electrical power supplied by the leads 108 to convert an electrical signal supplied by the leads 108 into a corresponding optical signal 150.

In the example of FIGS. 3A and 3B, the OSA 100 is configured such that the optical signal 150 generated by the transmitter 122 passes into the evacuated enclosure 112 and through the lens 114 which focuses the optical signal 150. The optical signal 150 then passes through the first cavity 116, through the optical device 200, through the third cavity 118, and into the port 120. When an optical connector of an optical cable (not shown) is plugged into the port 120, the optical signal 150 can enter into the optical cable, and thereby be transported to another component through the optical cable.

As the optical signal 150 passes through the optical device 200, the optical device 200 bends the optical signal 150 one or more times before the signal enters the fiber or waveguide. Among other things, this bending reduces or avoids performance degradation of the transmitter 122 due to backreflection.

Figure 4A:
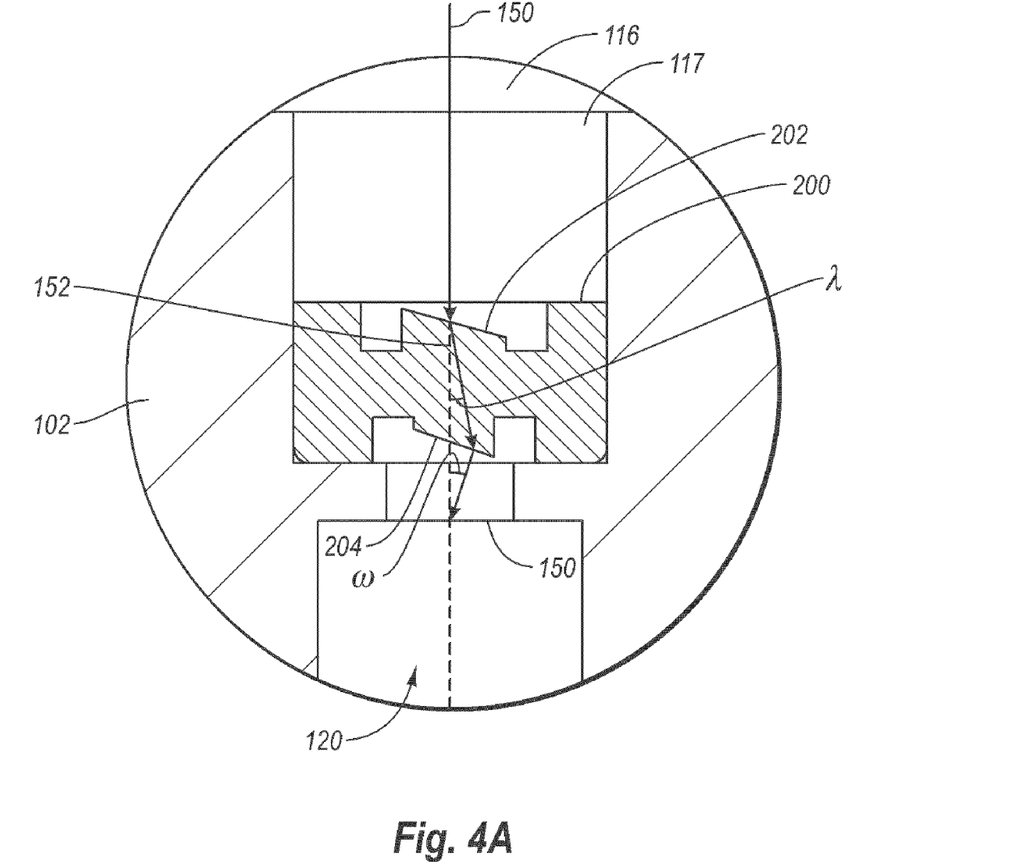
FIG. 4A discloses an optical device configured to manage backreflection in the optical sub-assembly of FIGS. 3A and 3B.

With continued reference to FIGS. 3A and 3B and now with reference also to FIG. 4A, aspects of an example optical device 200 are disclosed in greater detail. A variety of means may be employed to perform the functions of the example optical device 200. The optical device 200 includes a raised optical surface. The optical device 200 further includes peripheral portion and a boundary portion. A relief portion is defined between the boundary portion and the raised optical surface. Thus, the configuration of the example optical device 200 comprises but one exemplary structural implementation of a means for managing back reflection.

Accordingly, it should be understood that such structural implementations are disclosed herein solely by way of example and should not be construed as limiting the scope of the present invention in any way. Rather, any other structure or combination of structures effective in implementing the functionality disclosed herein may likewise be employed. By way of example, in some embodiments of the example OSA disclosed herein, any light-transmissible device capable of twice bending an optical signal could be used in place of the optical device 200.

The example optical device 200 can either be separately or integrally formed with the barrel 102. In addition, the optical device 200 can be formed from the same material as the barrel 102, or from a different material than the barrel 102, depending on the needs of a particular application. The optical device 200 can be formed from any light-transmissible material including, but not limited to, any light transmissible glass or plastic. For example, one or both of the optical device 200 and the barrel 102 can be formed from Ultem® plastic. The material from which the optical device 200 is formed must be light transmissible in order to allow the optical signal 150 to pass through the optical device 200.

The optical device 200 includes two angled surfaces through which the optical signal 150 must pass in order to exit the OSA 100. The term "angled" as used herein refers to a surface that non-perpendicular with respect to the longitudinal axis of a defined optical path, for example, an OSA/optical axis 152. The OSA/optical axis 152 is defined as the path between the point on the surface of the transmitter 122 where the optical signal 150 is generated and the center point on the optical fiber or optical waveguide where the optical signal 150 is ultimately directed, as disclosed in FIG. 4B. The OSA/optical axis 152 in the example OSA 100 also corresponds with the longitudinal axis of the OSA 100. For example, first and second surfaces 202 and 204 of the optical device 200 are angled with respect to the OSA/optical axis 152.

One or both of the angled surfaces 202 and 204 can be planar, spherical, or aspherical, or some combination thereof. When one or both of the angled surfaces 202 and 204 is spherical or aspherical, the axis of the spherical surface will be tilted to the desired angle of the angled surfaces 202 and 204. In some applications, the use of a spherical or aspherical surface for one or both of angled surfaces 202 and 204 can combine the function of the lens 114 and the angled surface or surfaces, thus eliminating the need for the lens 114. Combinations of one or more of the above aspects could enable fine tuning of the surface profile such that the optimum spot size, coupling efficiency, backreflection reduction and alignment stability are achieved.

The optical device 200 is positioned within the barrel 102 such that the optical signal 150 must pass through the optical device 200 in order to exit the OSA 100 through the port 120. Particularly, the optical signal 150 is incident first on the first surface 202 and then exits the optical device 200 through the second surface 204. In one example embodiment, the first angled surface 202 can optionally be coated with an anti-reflective coating to help reduce or avoid backreflection as the optical signal 150 passes through the first angled surface 202.

In general, the magnitude of the bending of the optical signal 150 by the optical device 200 is a function of the surface angles of the first and second surfaces 202 and 204. Thus, various desired effects can be achieved through variations to one or both of the surface angles of the first and second surfaces 202 and 204.

As the optical signal 150 passes through the first angled surface 202, the angle of the first angled surface 202 causes the optical signal 150 to be bent by "λ" degrees off the OSA/optical axis 152. Similarly, as the optical signal 150 passes through the second angled surface 204, the angle of the second angled surface 204 causes the optical signal 150 to be bent so at approach any optical fiber plugged into the port 120 at an angle of "ω" degrees off the OSA/optical axis 152. In general, the angle "ω" is within the numerical aperture of any optical fiber plugged into the port 120.

Figure 4B:
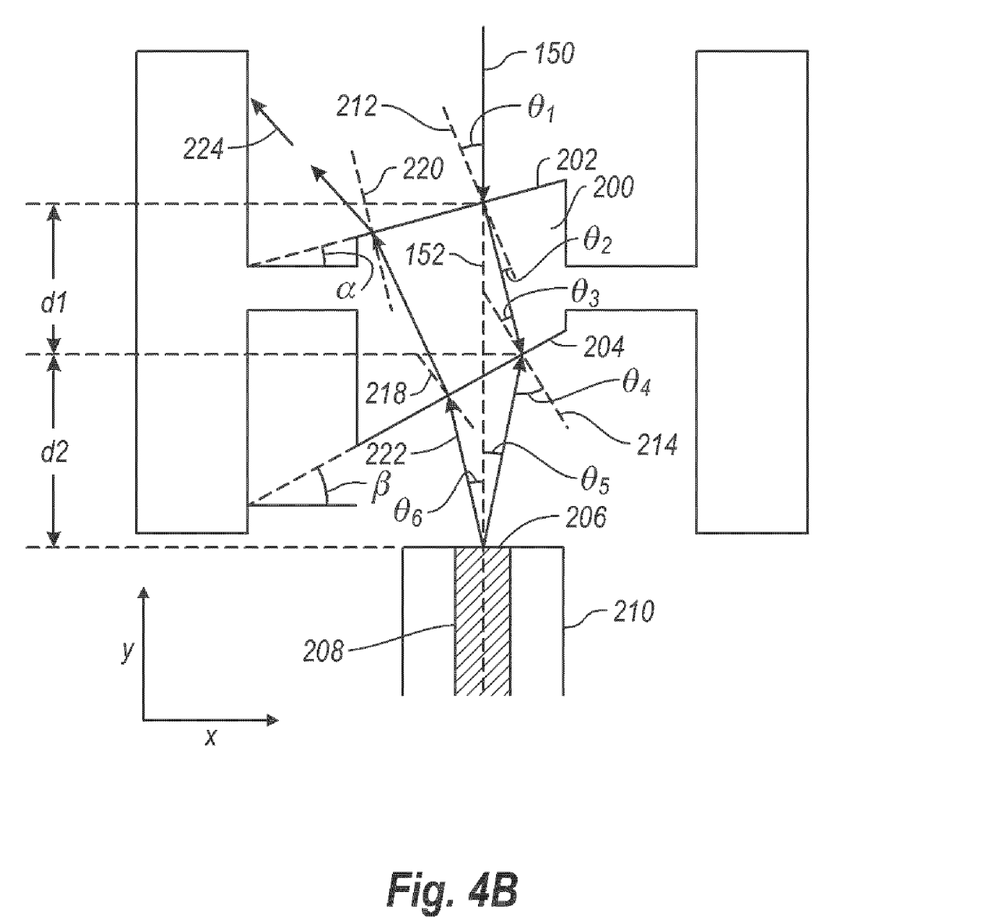
FIG. 4B discloses aspects of a design methodology for the optical device of FIG. 4A.

With reference now to FIG. 4B aspects of a design methodology for the example optical device 200 are disclosed. The optical surfaces are illustrated as flat for ease of reference. It will be appreciated that the optical device may include a raised optical surface, a peripheral portion, and a boundary portion in which a stepped portion defines a relieved portion between the raised optical surface and the boundary portion. In general, FIG. 4B discloses an optical cable 210 positioned relative to the optical device 200 in the position that the cable 210 would be positioned were it plugged into the port 120 of the OSA 100 of FIGS. 3A-4A. FIG. 4B discloses a first distance $d_1$ and a second distance $d_2$. The first distance $d_1$ is defined as the distance along the y axis between the points where the optical signal 150 enters through the first surface 202 and exits through the second surface 204, respectively. The second distance $d_2$ is defined as the distance along the y axis between the point where the optical signal 150 exits through the second surface 204 and the point where the optical signal 150 is incident upon a face 206 of a fiber 208. The fiber 208 may comprise a portion of the optical cable 210 that is plugged into the port 120, as disclosed in FIGS. 3B and 4A. In one example embodiment, the first distance $d_1$ is approximately equal to the second distance $d_2$, while, in other embodiments, the first distance $d_1$ and the second distance $d_2$ are not equal.

With continuing reference to FIG. 4B, the angle β(beta) is the angle between the first angled surface 202 and an imaginary surface substantially perpendicular to the OSA/optical axis 152. The magnitude of the angle β of the first angled surface 202 is such that little or none of the backreflection generated as the optical signal 150 is incident upon the first angled surface 202 will be directed back toward the transmitter 122. The angle α(alpha) is the angle between the second angled surface 204 and an imaginary surface perpendicular to the OSA/optical axis 152. In one example embodiment, the angles β and α are not equal while, in other embodiments, β and α are substantially equal to each other.

As discussed above, the extent to which the optical signal 150 is bent by the optical device 200 is a function of the surface angles β and α of the first and second surfaces 202 and 204, respectively. The angles $\theta_1$-$\theta_5$ (theta-sub1 through theta sub5) disclosed in FIG. 4B are ultimately determined by the angles β and α and by the material from which the optical device 200 is formed. The relative values of the angles β and α are dictated in part by the need for the optical signal 150 to be incident upon the surface 206 proximate the center of the fiber 208 of the optical cable 210 and within the numerical aperture of the fiber 208. The normal lines 212, 214, 218, and 220 in FIG. 2B are each perpendicular to one of the angled surfaces 202 or 204 of the optical device 200.

As disclosed in FIG. 4B, one methodology for determining the angles β and α of planar surfaces can be expressed by the following three equations:

$$\sin \theta_1 = n \cdot \sin \theta_2 \quad \quad 1)$$

$$\sin \theta_4 = n \cdot \sin \theta_3 \quad \quad 2)$$

$$-\theta_1 + \theta_2 - \theta_3 + \theta_4 = \theta_5 \quad \quad 3)$$

Where:
  n is the refractive index of the material from which the optical device 200 is constructed;
  $\theta_1$ is the angle between the optical signal 150 and the normal line 212 before the optical signal 150 has passed through the first angled surface 202;
  $\theta_2$ is the angle between the optical signal 150 and the normal line 212 after the optical signal 150 has passed through the first angled surface 202;
  $\theta_3$ is the angle between the optical signal 150 and the normal line 214 after the optical signal 150 has passed through the first angled surface 202 but before the optical signal 150 has passed through the second angled surface 204;
  $\theta_4$ is the angle between the optical signal 150 and the normal line 214 after the optical signal 150 has passed through the second angled surface 204; and
  $\theta_5$ is the angle between the optical signal 150 and the OSA/optical axis 152 after the optical signal 150 has passed through the second angled surface 204 but before the optical signal 150 has passed through the surface 206 of the fiber 208 of the optical cable 210.

For example, and applying the foregoing formulas, where the angle $\theta_1=7°$ and where the optical device 200 is formed from Ultem® having a refractive index of=1.63, then the angle $\theta_2=4.3°$, the angle $\theta_3=8°$, the angle $\theta_4=12.7°$, and the angle $\theta_5=2°$. In addition, the angle β=7° and the angle α=11°. Although the optical device 200 is configured to cause the angle $\theta_5$ to be greater than 0°, the optical device 200 is also configured to ensure that the angle $\theta_5$ is not greater than the numerical aperture of the optical cable 210 that is connected to the OSA 100. As used herein, the term "numerical aperture" refers to the maximum angle to the longitudinal axis of the fiber 208 at which light can be launched into and constrained within the fiber 208 of the optical cable 210. The longitudinal axis of the fiber 208 corresponds in this example to the OSA/optical axis 152.

Also disclosed elsewhere herein, backreflection can be generated in some situations when the optical signal 150 is incident upon one or more surfaces within the OSA 100. For example, backreflection 222 can be created when a portion of the optical signal 150 is reflected by the surface 206 of the fiber 208 of the optical cable 210 instead of passing through the surface 206 into the fiber 208. However, due to the fact that the optical signal 150 strikes the surface 206 at an angle $\theta_5$, any backreflection 222 is directed at an angle $\theta_6$ toward the optical device 200. The angle $\theta_6$ is the angle between the backreflection 222 and the OSA/optical axis 152. In one example embodiment, the angle $\theta_6$ is substantially equal to the angle $\theta_5$. As disclosed in the example of FIG. 4B, the backreflection 222 is twice bent as it passes through the second and first angled surfaces 204 and 202. This bending, when combined with the effects of the initial angle $\theta_6$, results in a final direction of travel 224 for the backreflection 222, where the direction of travel 224 is away from the transmitter 122 as disclosed in FIG. 4B. For example, where the optical signal 150 strikes the surface 206 at an angle of 2° off the longitudinal axis of the fiber 208, the final direction of travel 224 of the backreflection 222 may be 5° off the longitudinal axis of the fiber 208.

The example embodiments of the optical device disclosed herein can therefore manage the negative effects of backreflection in OSAs in several ways. When integrated into a TOSA, for example, the first angled surface of the optical device causes any backreflection generated at the first angled surface to be redirected such that the backreflection is directed away from a sensitive optoelectronic transmitter within the TOSA. Similarly, the angled surfaces of the optical device cause any backreflection generated at the surface of an optical fiber or optical waveguide to likewise be redirected such that the backreflection is directed away from the TOSA's transmitter. When integrated into a ROSA, the angled surfaces of the optical device can redirect any backreflection generated within the ROSA away from the ROSA's port so that the backreflection does not travel as optical feedback through an optical cable or waveguide back to a sensitive optoelectronic transmitter in a distant TOSA.

Further, the example optical device disclosed herein can be integrally molded as part of a barrel of an OSA. Integrally forming the optical device as part of the barrel of an OSA enables the cost of the material from which the optical device is formed to be absorbed into the cost of the barrel. Also, integrally forming the optical device as part of the barrel of an OSA eliminates the cost of assembling the optical device into the OSA.

In an alternative to the arrangement disclosed in FIGS. 3A-4B, multiple optical devices 200 could be included within a single OSA to further isolate any backreflection within the OSA. Thus, example embodiments having multiple optical devices 200 serially arranged within an OSA are possible and contemplated. In addition, the example optical device 200 can be used in conjunction with other known devices for reducing backreflection. For example, the optical device 200 can be used in conjunction with a quarter wave plate in order to achieve desired effects with respect to optical isolation against backreflection.

When the optical device 200 is used in conjunction with a quarter wave plate, for example, the quarter wave plate can be positioned anywhere between the laser 122 and the lens 114, between the lens 114 and the optical device 200, or between the optical device 200 and the optical fiber 208. Further, the optical device 200 can be used in other optical applications. For example, the optical device 200 can be used in a metal port of any optical component where backreflection may be a concern.

The present invention may be embodied in other specific forms without departing from its spirit or essential characteristics. The described embodiments are to be considered in all respects only as illustrative and not restrictive.

What is claimed is:

1. An optical component, comprising:
   a first central optical surface proximate an optical axis;
   a first peripheral portion extending radially from the first central optical surface;
   a first stepped portion between the first central optical surface and the first peripheral portion, the first stepped portion being formed to raise the first central optical surface above the first peripheral portion;
   a second central optical surface opposite a radial plane from the first central optical surface;
   a second peripheral portion extending radially from the second central optical surface;
   a second stepped portion between the second central optical surface and the second peripheral portion, the second stepped portion being formed to raise the second central optical surface above the second peripheral portion.

2. The optical component of claim 1, further comprising a boundary portion extending axially and radially from the first peripheral portion.

3. The optical component of claim 2, wherein the boundary portion is raised above the first central optical surface.

4. The optical component of claim 1, wherein the optical component includes a body formed from a material that is at least partially transmissible to light, the body configured to be positioned in an optical sub-assembly between an optoelectronic transducer and an optical cable or waveguide.

5. The optical component of claim 1, wherein the first central surface includes at least one of a flat surface, a spherical surface, and an aspherical surface.

6. The optical component of claim 1, wherein the optical component comprises at least one of a prism and a lens.

7. An optical component, comprising:
   a first optical surface having an optical axis extending therethrough;
   a first peripheral portion adjacent the first optical surface;
   a second optical surface opposite a radial plane from the first optical surface;
   a second peripheral portion adjacent the second optical surface; and
   a boundary portion adjacent the first and second peripheral portions wherein at least a portion of the first peripheral portion defines a recess between the boundary portion and the first optical surface.

8. The optical component of claim 7, wherein the first optical surface is raised relative to the first peripheral portion.

9. The optical component of claim 7, wherein the boundary portion is raised above the first optical surface and the first peripheral portion.

10. The optical component of claim 7, further comprising a stepped portion between the first peripheral portion and the first optical surface.

11. The optical component of claim 7, further comprising a stepped portion between the first peripheral portion and the boundary portion.

12. The optical component of claim 7, wherein the first optical surface is formed of a plastic material.

13. An optical sub-assembly, comprising:
   an opto-mechanical holder; and
   an optical component secured to the opto-mechanical holder, the optical component including a first central optical surface proximate an optical axis, a first peripheral portion extending radially from the first central optical surface, a first stepped portion between the first central optical surface and the first peripheral portion, the first stepped portion being formed to raise the first central optical surface above the first peripheral portion, a second central optical surface opposite a radial plane from the first central optical surface, a second peripheral portion extending radially from the second central optical surface, and a second stepped portion between the second central optical surface and the second peripheral portion, the second stepped portion being formed to raise the second central optical surface above the second peripheral portion.

14. The optical sub-assembly of claim 13, wherein the optical component includes at least one of a lens and a optical device for managing back reflection.

15. The optical sub-assembly of claim 13, wherein the optical component is press fit to the opto-mechanical holder.

16. The optical sub-assembly of claim 15, wherein the optical component is formed of a plastic material.

17. The optical sub-assembly of claim 13, wherein the optical component includes a body formed from a material that is at least partially transmissible to light, the body configured to be positioned in an optical sub-assembly between an optoelectronic transducer and an optical cable or waveguide.

18. The optical sub-assembly of claim 13, wherein the first central optical surface has a first angle and the second central optical surface has a second angle, wherein the first and the second angles are equal.

19. The optical sub-assembly of claim 13, wherein the first central optical surface has a first angle and the second central optical surface has a second angle, wherein the first and second angles are not equal.

20. The optical sub-assembly of claim 13, wherein the optical component further includes a boundary portion adjacent the first peripheral portion.

* * * * *